April 7, 1964 B. DRAKE ETAL 3,128,347

ARRANGEMENTS FOR AUTOMATICALLY IDENTIFYING CALLING NUMBERS IN TELEPHONE SYSTEMS

Filed Jan. 26, 1962 9 Sheets-Sheet 1

April 7, 1964 B. DRAKE ETAL 3,128,347

ARRANGEMENTS FOR AUTOMATICALLY IDENTIFYING CALLING NUMBERS IN TELEPHONE SYSTEMS

Filed Jan. 26, 1962 9 Sheets-Sheet 2

April 7, 1964 B. DRAKE ETAL 3,128,347
ARRANGEMENTS FOR AUTOMATICALLY IDENTIFYING
CALLING NUMBERS IN TELEPHONE SYSTEMS
Filed Jan. 26, 1962 9 Sheets-Sheet 4

April 7, 1964 B. DRAKE ETAL 3,128,347

ARRANGEMENTS FOR AUTOMATICALLY IDENTIFYING CALLING NUMBERS IN TELEPHONE SYSTEMS

Filed Jan. 26, 1962 9 Sheets-Sheet 6

April 7, 1964 B. DRAKE ETAL 3,128,347

ARRANGEMENTS FOR AUTOMATICALLY IDENTIFYING CALLING NUMBERS IN TELEPHONE SYSTEMS

Filed Jan. 26, 1962 9 Sheets-Sheet 7

April 7, 1964 B. DRAKE ETAL 3,128,347

ARRANGEMENTS FOR AUTOMATICALLY IDENTIFYING CALLING NUMBERS IN TELEPHONE SYSTEMS

Filed Jan. 26, 1962 9 Sheets-Sheet 8

United States Patent Office 3,128,347 Patented Apr. 7, 1964

3,128,347

ARRANGEMENTS FOR AUTOMATICALLY IDENTIFYING CALLING NUMBERS IN TELEPHONE SYSTEMS

Bernard Drake, London, John Brownlie Clark, Bexleyheath, Kent, Percy William Hicks, Dartford, Kent, and James George Taylor, London, England, assignors to Associated Electrical Industries Limited, London, England, a British company Filed Jan. 26, 1962, Ser. No. 168,946
Claims priority, application Great Britain Mar. 13, 1961
5 Claims. (Cl. 179—18)

Figure 1:
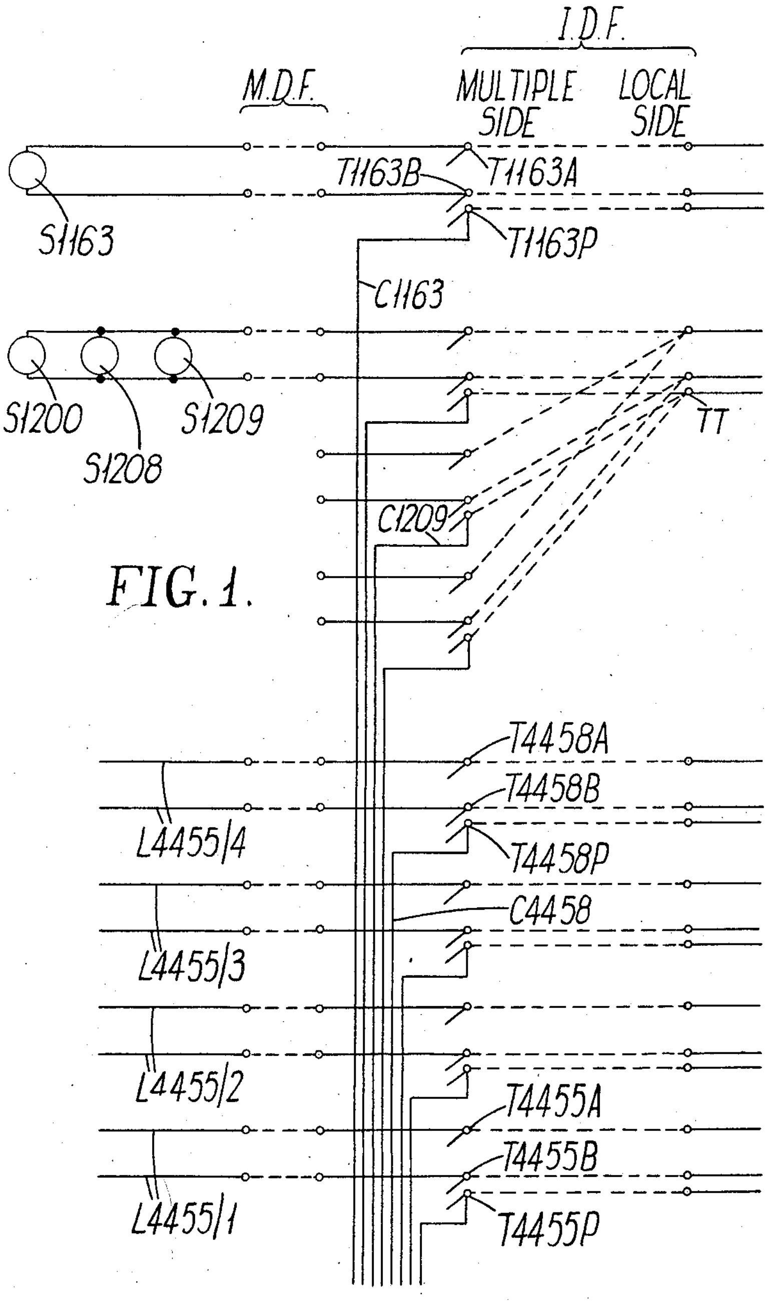
Figure 2:
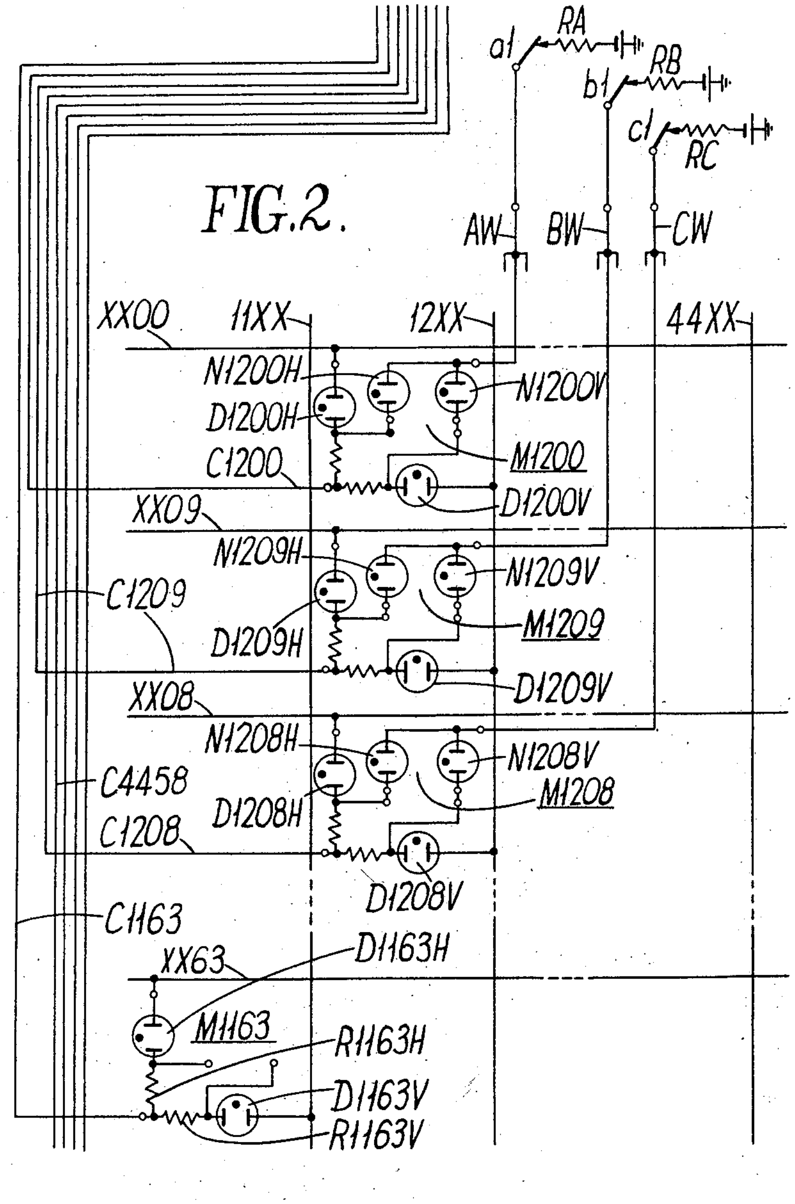
Figure 3:
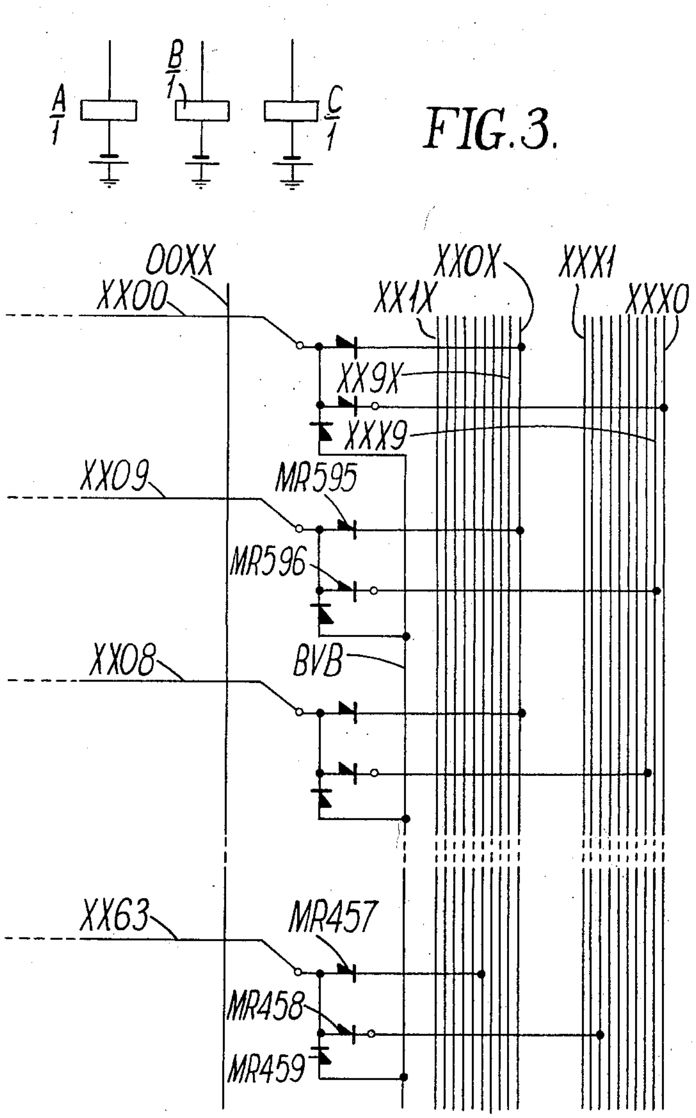
Figure 4:
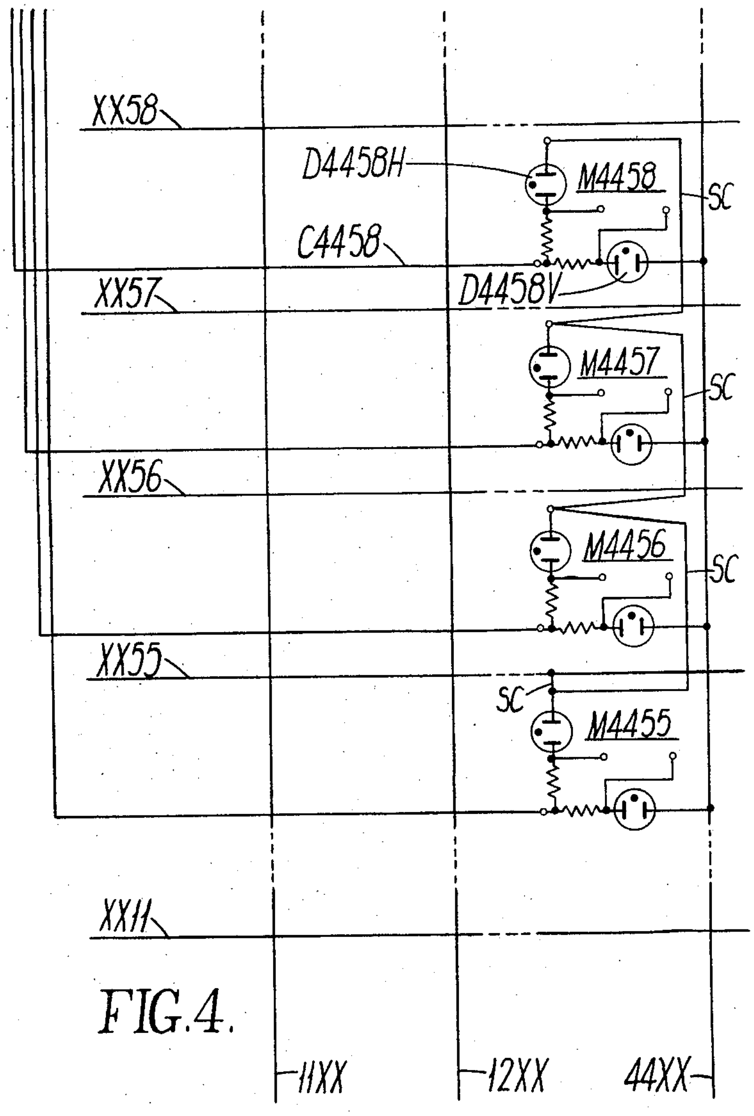
Figure 5:
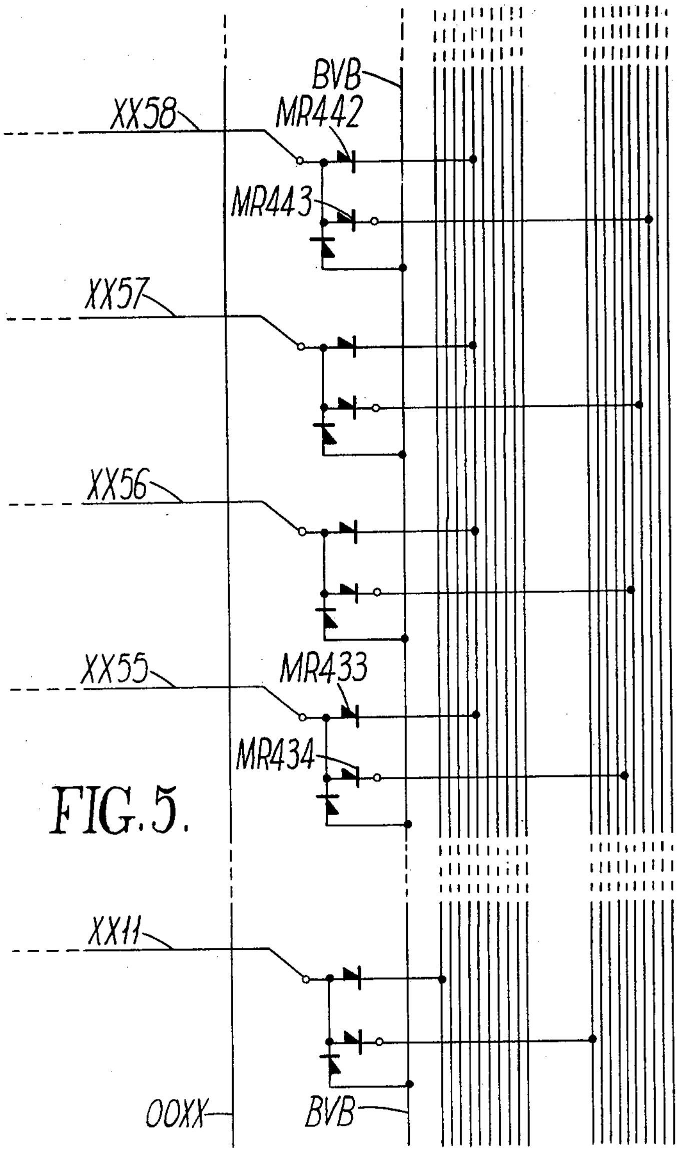
Figure 6:
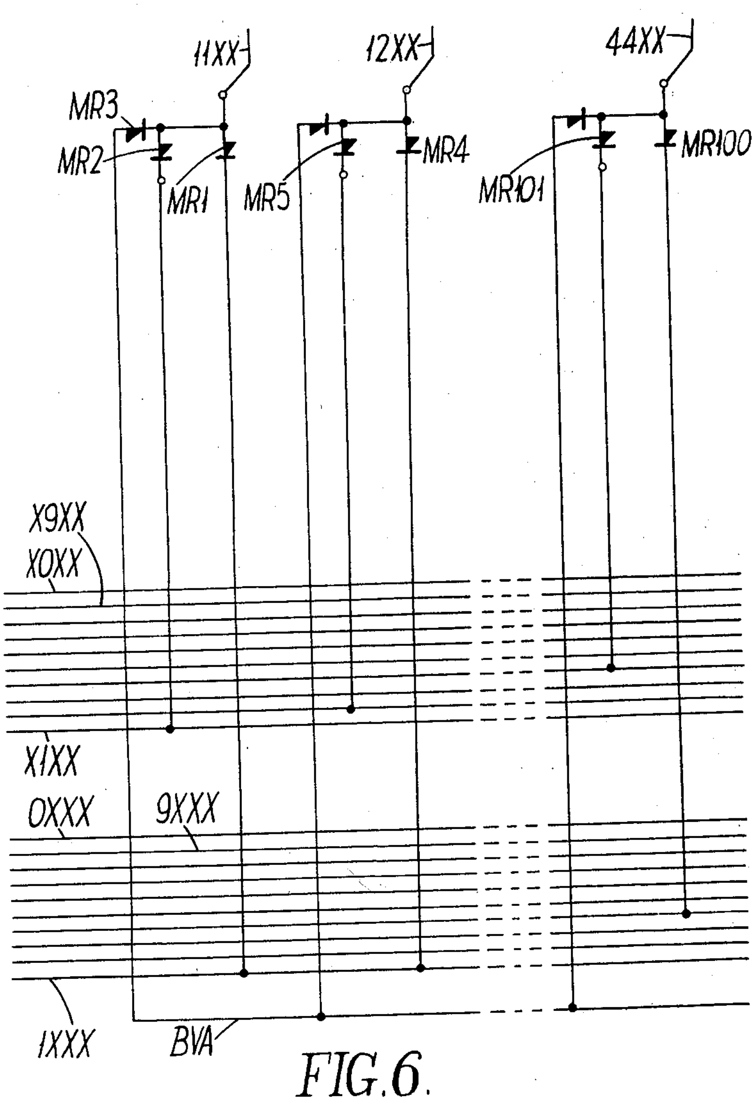
Figure 7:
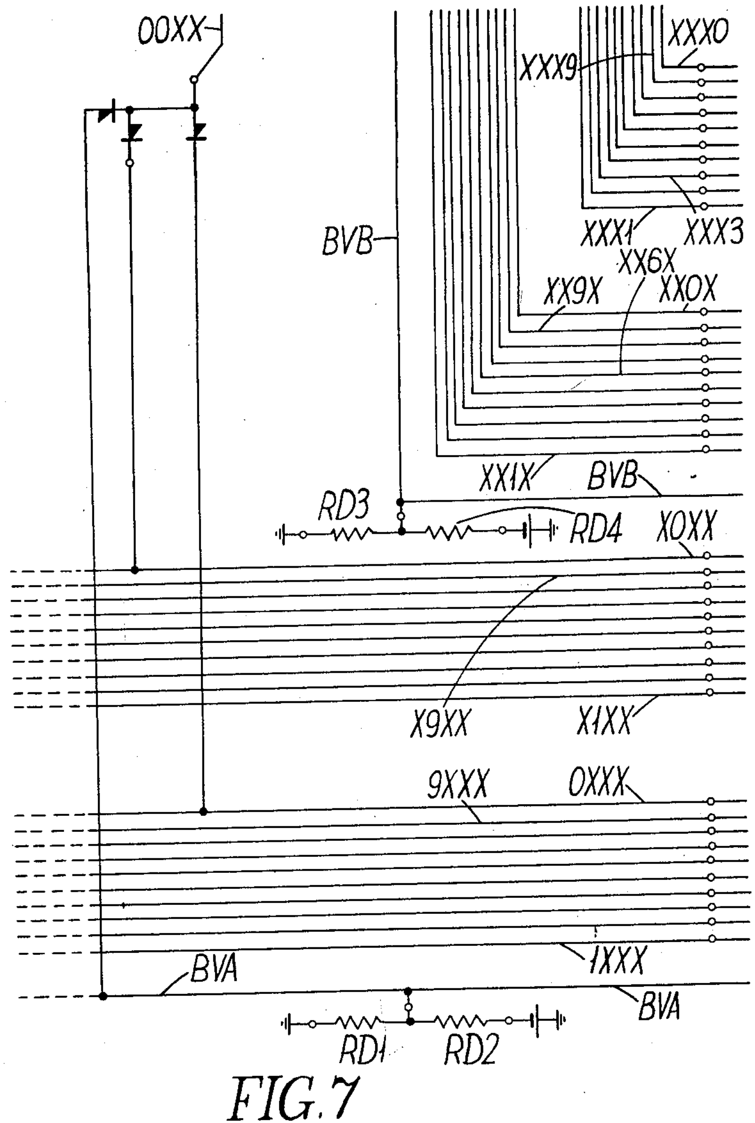

This invention relates to arrangements for automatically identifying calling numbers in telephone systems, and more particularly to such arrangements which are of the kind in which the application of an electrical marking condition to an input conductor individual to a calling line gives rise to electrical marking conditions, representing the four digits of a four-digit decimal number that constitutes the requisite calling number in respect of the call concerned, upon four sets of output conductors comprising one set for each digit place.

Automatic calling-number-identifying arrangements of the kind referred to are now being increasingly required in telephone systems, to serve for automatically identifying calling numbers in connection with the charging or accounting of calls such as so-called trunk calls.

In a modern telephone system, each station on a party line has its own number, and, so far as calling number identification in respect of calls outgoing from a private branch exchange is concerned, all the lines of the relevant group of private branch exchange lines have the same number. Thus, in the case of a telephone exchange having party lines and private branch exchange lines connected to it, calling number identification is a more complex matter than mere calling line identification.

The present invention provides an automatic calling-number-identifying arrangement of the kind referred to which is not only a straightforward and efficient arrangement so far as the fulfilment of the basic requirement of furnishing calling number identification in respect of a calling station having its own individual line is concerned, but is also such that both party lines and groups of private branch exchange lines can be catered for simply and conveniently.

According to a main feature of the invention, there is provided, in or for a telephone exchange, an arrangement for automatically identifying calling numbers wherein a group of thousands-hundreds conductors and a group of tens-units conductors constitute (either physically or in effect) one cross-point for and corresponding to each of a plurality of four-digit decimal numbers constituting the numbers the arrangement is capable of identifying, and wherein there is, for and individual to each of these cross-points, a cross-point circuit that comprises a pair of cold-cathodes gas-filled diodes serving as (and hereinafter termed) coupling gas-filled diodes and that further comprises at least two resistors serving as (and hereinafter termed) coupling resistors and that serves so to couple an input conductor, individual to a line to which the particular four-digit decimal number corresponding to the cross-point pertains, to the particular thousands-hundreds conductor and tens-units conductor forming the cross-point that so far as the particular cross-point circuit is concerned each of these two conductors forming the cross-point is normally isolated from said input conductor by a coupling gas-filled diode in the non-conducting condition and is normally isolated from the other conductor of the two by two coupling gas-filled diodes in the non-conducting condition, and wherein each thousands-hundreds conductor is coupled over respective ones of two isolating rectifiers individual to it to a corresponding thousands-digit decimal output conductor and to a corresponding hundreds-digit decimal output conductor, and each tens-units conductor is coupled over respective ones of two isolating rectifiers individual to it to a corresponding tens-digit decimal output conductor and to a corresponding units-digit decimal output conductor, the arrangement as a whole being such that an electrical marking condition applied, for effecting identification of the calling number in respect of a call, to the particular input conductor relevant to the call, causes each coupling gas-filled diode of the appropriate cross-point circuit to conduct in series with at least one coupling resistor of this cross-point circuit and thereby produces current flow in the low-resistance direction through each of the four said isolating rectifiers pertaining to the particular thousands-hundreds conductor and tens-units conductor forming the cross-point concerned, causing an electrical marking condition to appear upon each of the relevant four decimal output conductors.

In carrying out the invention, so-called neon tubes of the miniature type may be employed as the cold-cathode gas-filled diodes.

The arrangement in accordance with the main feature just set forth is effectively one comprising two ranks of marking-splitting apparatus, namely (i) a first rank comprising what have been termed the cross-point circuits and serving in effect to split a marking condition applied to an input conductor into a marking condition on two conductors, these two conductors being the relevant thousands-hundreds conductor and the relevant tens-units conductor, and (ii) a second rank comprising the isolating rectifiers and serving in effect to split the marking condition on the relevant thousands-hundreds conductor into a marking condition on two conductors, these two conductors being the relevant thousands-digit decimal output conductor and the relevant hundreds-digit decimal output conductor, and to split the marking condition on the relevant tens-units conductor into a marking condition on two conductors, these two conductors being the relevant tens-digit decimal output conductor and the relevant units-digit decimal output conductor. The arrangement has the advantage that it (*a*) in the first rank, where the number of circuits (input conductors in this case) coupled in common to a single common conductor (a thousands-hundreds conductor or a tens-units conductor in this case) may be as high as one hundred, makes use of the isolating qualities of cold-cathode gas-filled diodes to prevent the false transmission of a marking condition over sneak paths from such a common conductor, while it (*b*) in the second rank, where the number of circuits (thousands-hundreds conductors or tens-units conductors in this case) coupled in common to a single common conductor (a decimal output conductor in this case) is normally, and cannot exceed, ten (so that decoupling to prevent false transmission of a marking condition is a less critical matter), makes use of rectifiers with their advantageous low-resistance in the direction of true transmission.

In the case of a specific form of calling-number-identifying arrangement according to the invention which is at present especially contemplated, each input conductor is connected to a private wire individual to the line to which the input conductor pertains, and the electrical marking condition applied to an input conductor for effecting identification of a calling number is transmitted to the input conductor over a through private wire set up for the call concerned and is a positive unidirectional pulse of short duration (for example 3 to 5 milliseconds) and of a voltage (for example 150 volts) that is high compared with the voltage of the exchange battery. Several advantages result from the use of such a pulse for signalling over a through private wire for the purposes of calling number identification. One advantage is that such a pulse does not give rise to any complication in regard to the use of alternating current signals for signalling "class of service" or such like information over a through private wire over which the pulse is transmitted. Another advantage is that such a pulse, owing to its short duration, will not operate a subscriber's meter connected to a through private wire over which the pulse is transmitted. Yet another advantage is that such a pulse, owing to its relatively high voltage, is not simulated by the application of normal exchange positive battery to a through private wire for metering or call tracing purposes. A still further advantage is that such a pulse may readily be produced, without it being necessary to provide a special high-voltage supply at the exchange concerned, by discharging in series, with the negative side of the series connection earthed, a plurality of capacitors previously charged in parallel from a normal exchange battery. In a particular arrangement which is contemplated, such a pulse has an effective voltage of plus 150 volts, and is produced by discharging in series three capacitors previously charged in parallel from an exchange battery (negative battery) of minus 50 volts, a high-speed relay being arranged to complete the relevant discharging circuit (subsequent to the preparation of this circuit) for a period giving the requisite pulse duration.

According to one subordinate feature of the invention, in a calling-number-identifying arrangement according to the main feature previously set forth, a partly line has individual to it one input conductor for and corresponding to each station on the line, and each of these input conductors is coupled by a cross-point circuit to the particular thousands-hundreds conductor and tens-units conductor forming the cross-point corresponding to the particular four-digit decimal number peculiar to the station to which the input conductor pertains, and provision is made whereby, when calling-number identification is carried out in respect of a call from a station on the line, it is, as regards coupling gas-filled diodes, only the two coupling gas-filled diodes in the cross-point circuit pertaining to the input conductor corresponding to the particular station concerned that are caused to conduct.

The subordinate feature just set forth presumes, of course, that the telephone system concerned is one in which the "party identity" of a calling station on a party line (i.e., in effect whether the station is the first or second or *n*th station on the line) is signalled to, and registered at, the exchange. It is contemplated that where such registration is effected in a line or other circuit individual to or closely associated with the party line concerned, the feature may be carried out by arranging that the registration in itself results directly in the connection of the relevant input conductor of the calling-number-identifying arrangement to receive, to the exclusion of the input conductor or conductors pertaining to the other station or stations on the same line, the electrical marking condition that serves to bring about the conduction of coupling gas-filled diodes in respect of the call. A further subordinate feature of the invention provides for the carrying out of the first-mentioned subordinate feature in other circumstances.

According to said further subordinate feature of the invention, each of the cross-point circuits that pertain to stations on party lines is provided with an inhibiting circuit element which is individual to the particular cross-point circuit and which is such that it normally inhibits the bringing of the coupling gas-filled diodes of the particular cross-point circuit to the conducting condition, and provision is made whereby, when calling-number identification is carried out in respect of a call from a station on a party line, the inhibiting circuit element individual to the cross-point circuit pertaining to the particular station is disabled (to permit the coupling gas-filled diodes of this particular cross-point circuit to be brought to the conducting condition) by a disabling operation affecting the inhibiting circuit elements of all cross-point circuits that pertain to party line stations having the same "party identity" as the particular station concerned, the electrical marking condition that serves to bring about the conduction of coupling gas-filled diodes being applied, during the disablement effected by this disabling operation, to the input conductors pertaining to all the stations on the particular party line concerned.

In the preferred manner of carrying out the invention in accordance with the last-mentioned feature, each cross-point circuit comprises a first coupling resistor and a first coupling gas-filled diode connected in series, in the order stated, between the relevant input conductor and the relevant thousands-hundreds conductor, and further comprises a second coupling resistor and a second coupling gas-filled diode connected in series, also in the order stated, between this input conductor and the relevant tens-units conductor, and the inhibiting circuit element with which a cross-point circuit pertaining to a station on a party line is provided comprises a pair of cold-cathode gas-filled diodes (hereinafter termed inhibiting gas-filled diodes) one of which is connected between, on the one hand, the junction between the first coupling resistor and the first coupling gas-filled diode of the cross-point circuit and, on the other hand, a control wire common to the inhibiting circuit elements of all cross-point circuits that pertain to party line stations having the same "party identity" as the particular station concerned, and the other of which is connected between said control wire on the one hand and the junction between the second coupling resistor and the second coupling gas-filled diode of the cross-point circuit on the other hand, the disabling of the inhibiting circuit element when requisite being effected by the disconnection, at a contact of a control relay, of said control wire from a source of negative battery potential to which it is normally connected. In the case of these preferred arrangements, as long as the control wire to which the inhibiting gas-filled diodes of an inhibiting circuit element are connected remains connected to the source of negative battery potential to which it is normally connected, any positive unidirectional pulse of the kind transmitted for the purposes of calling-number identification, and received over the input conductor to which the cross-point circuit concerned pertains, causes these inhibiting gas-filled diodes to conduct with the consequence that the pulse is rendered ineffective so far as bringing the coupling gas-filled diodes of this cross-point circuit to the conducting condition is concerned. In one possible alternative to these preferred arrangements, rectifiers are used in place of the inhibiting gas-filled diodes, each such rectifier being connected in the sense in which the low-resistance direction of current flow is towards the control wire concerned. In another possible alternative, each cross-point circuit comprises a first coupling resistor connected between the relevant input conductor and a junction point of the cross-point circuit, a second coupling resistor and a first coupling gas-filled diode connected in series between said junction point and the relevant thousands-hundreds conductor, and a third coupling resistor and a second coupling gas-filled diode connected in series between said junction point and the relevant tens-units conductor, and the inhibiting circuit element with which a cross-point circuit pertaining to a station on a party line is provided comprises a single inhibiting gas-filled diode which is connected between said junction point and the control wire concerned.

According to a still further subordinate feature of the invention, a group of private branch exchange lines pertaining to a private branch exchange is provided with an input conductor, and a cross-point circuit, for and individual to each line of the group, and in effect takes up, exclusively to itself, a series of the four-digit decimal numbers that comprises one number for each line in the group and that includes the particular four-digit decimal number which is the identification number for all the lines of the group so far as calling-number identification is concerned and that is a series of consecutive numbers all having the same thousands digit and hundreds digit, and the cross-point circuits pertaining to the group are provided in the positions corresponding to said series of the four-digit decimal numbers, these cross-point circuits being connected to the relevant thousands-hundreds conductor, the same for all of them, in the same way as if each cross-point circuit concerned pertained to an ordinary subscriber's line and being connected to the relevant tens-units conductor, namely the one corresponding to said identification number and again the same for all of them, by connections comprising direct connections between them. In the case of the specific form of calling-number-identifying arrangement according to the invention which is at present especially contemplated, said connections comprising direct connections between the cross-point circuits pertaining to a group of private branch exchange lines are simple connections made by a simple strapping operation.

In the case of the contemplated specific form of calling-number-identifying arrangement just mentioned, each decimal output conductor is connected to a transistor amplifier that serves for amplifying the current fed to the conductor, when requisite, by way of the relevant isolating rectifier. Where, as is contemplated, each such amplifier is one of a kind constituted and connected so that its input impedance includes the emitter-base resistance of a transistor (e.g., a silicon transistor), and such input impedance is therefore, unless special provision is made, subject to the wide variations that prevail in the characteristics of these semi-conductor devices, it becomes necessary in practice to make special provision to ensure that an adequate proportion of the current passing through a coupling gas-filled diode in respect of a call passes to each of the two decimal output conductors concerned despite wide differences in the characteristics of the respective transistors connected to these two decimal output conductors. According to yet another subordinate feature of the invention, this special provision is made by including, in the individual circuit of the base electrode of each of the transistors concerned, a load resistor of a resistance (for example, 3,300 ohms) sufficient to produce the effect that the effective differential emitter-base resistance of the transistor rises materially once the transistor has bottomed. In this way, it can readily be arranged, by a suitable choice of the circuit constants, that what happens when a coupling gas-filled diode becomes conducting in respect of a call is that, of the two transistors respectively connected to the relevant two decimal output conductors, the one having inherently the lower emitter-base resistance takes the major proportion of the available current until it has bottomed and then, owing to the rise in the effective differential emitter-base resistance of this particular transistor once it has bottomed, the other transistor of the two obtains sufficient current also to bottom.

Figure 8:
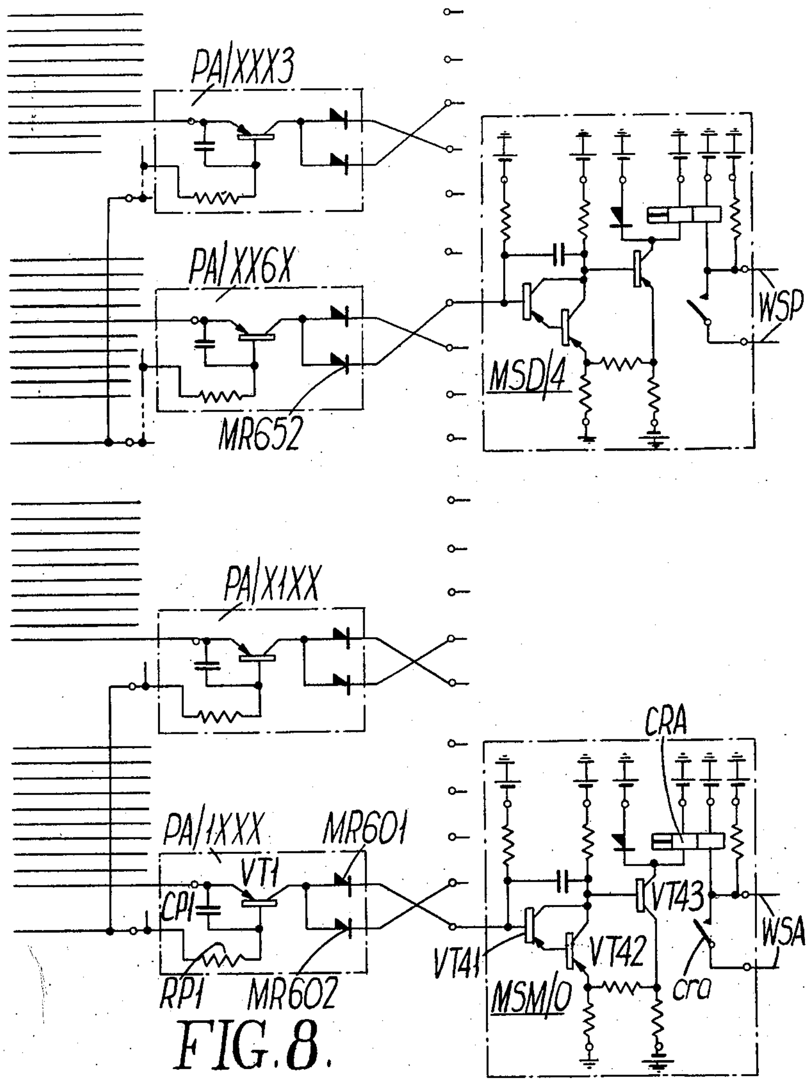
Figure 9:
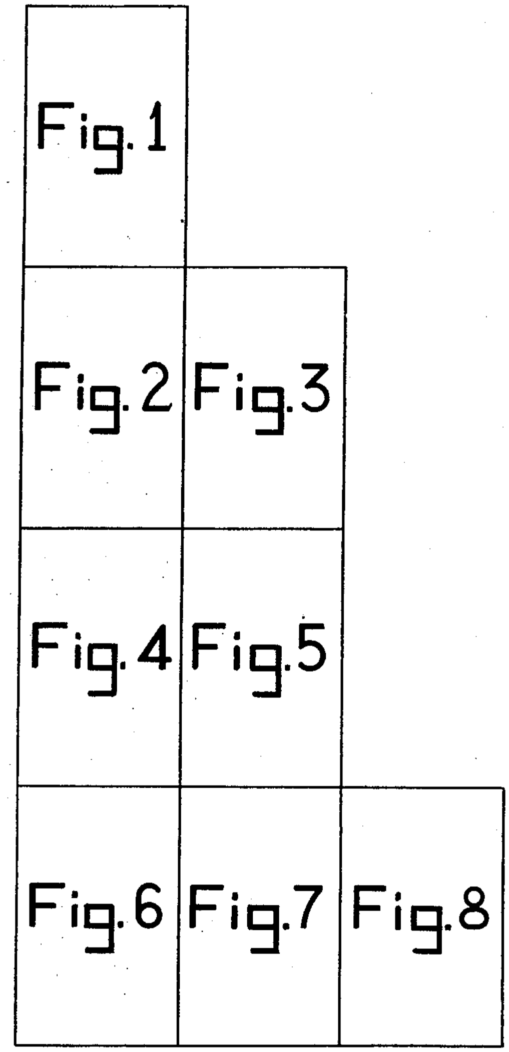

The previously-mentioned and other features of the invention are exemplified in the specific embodiment of the invention which will now be described with reference to the accompanying drawings. This specific embodiment is a calling-number-identifying arrangement of the especially contemplated form previously referred to, and is, when equipped to its full capacity, capable of identifying numbers in the range 0000 to 9999, that is, ten thousand four-digit decimal numbers. FIGS. 1 to 8 of the drawings together constitute a single circuit diagram illustrating the circuit arrangements of the calling-number-identifying arrangement concerned, and FIG. 9 is a diagram showing how FIGS. 1 to 8 should be arranged to form this single circuit diagram.

Referring now to the circuit diagram constituted by FIGS. 1 to 8, this for the sake of simplicity only shows typical circuit elements and conductors and connections of the calling-number-identifying arrangement. At the top of the circuit diagram (FIG. 1) are shown certain terminals on the main distribution frame (M.D.F.) of the telephone exchange in which the calling-number-identifying arrangement is situated, and certain terminals on the intermediate distribution frame (I.D.F.) in this exchange. Also shown at the top of the circuit diagram, and represented as being effectively connected in circuit with the exchange apparatus by cross-connections carried out on the two frames referred to, are an ordinary subscriber's line pertaining to an ordinary subscriber's station S1163, a party line pertaining to party line stations S1200, S1208 and S1209, and four lines L4455/1 to L4455/4 constituting a group of private branch exchange lines pertaining to a private branch exchange. For each ordinary subscriber's station and each party line station and each private branch exchange line there are on the multiple side of the intermediate distribution frame (I.D.F.) a pair of speaking wire terminals such as T1163A and T1163B, or T4455A and T4455B, or T4458A and T4458B, and a private wire terminal such as T1163P, T4455P, or T4458P. Each private wire terminal on the multiple side of the intermediate distribution frame is connected to a corresponding input conductor, such as C1163, C1209, or C4458, of the calling-number-identifying arrangement. This arrangement comprises 100 thousands-hundreds conductors, of which are shown only the conductor 11XX pertaining to the combination of the thousands digit "1" and the hundreds digit "1," the conductor 12XX pertaining to the combination of the thousands digit "1" and the hundreds digit "2," the conductor 44XX pertaining to the combination of the thousands digit "4" and the hundreds digit "4" and the conductor 00XX pertaining to the combination of the thousands digit "0" and the hundreds digit "0." It further comprises 100 tens-units conductors, of which are shown only the conductor XX11 pertaining to the combination of the tens digit "1" and the units digit "1," the conductor XX55 pertaining to the combination of the tens digit "5" and the units digit "5," the conductor XX56 pertaining to the combination of the tens digit "5" and the units digit "6," the conductor XX57 pertaining to the combination of the tens digit "5" and the units digit "7," the conductor XX58 pertaining to the combination of the tens digit "5" and the units digit "8," the conductor XX63 pertaining to the combination of the tens digit "6" and the units digit "3," the conductor XX08 pertaining to the combination of the tens digit "0" and the units digit "8," the conductor XX09 pertaining to the combination of the tens digit "0" and the units digit "9," and the conductor XX00 pertaining to the combination of the tens digit "0" and the units digit "0." The thousands-hundreds and tens-units conductors constitute in effect one cross-point for and corresponding to each of the numbers the calling-number-identifying arrangement is capable of identifying. The only cross-point circuits shown in the circuit diagram are the cross-point circuits M1163, M1200, M1208, and M1209 pertaining to the stations S1163, S1200, S1208, and S1209 respectively, and the cross-point circuits M4455, M4456, M4457, and M4458 pertaining to the private branch exchange lines L4455/1, L4455/2, L4455/3, and L4455/4 respectively. In order to simplify the circuit diagram, the party line shown at the top of the circuit diagram is illustrated as having three stations, but this number of stations is only exemplary and any reasonable number of stations (on a party line) from two upwards can readily be catered for so far as the calling-number-identifying arrangement is concerned. Also for the purpose of simplifying the circuit diagram, it has been assumed that the four-digit decimal numbers peculiar to the three stations S1208, S1209, and S1200 on the party line shown are numbers (the numbers 1208, 1209, and 1200 respectively) which are such as to involve three consecutive cross-point circuits associated with the same thousands-hundreds conductor, but it is in no way necessary that the four-digit decimal numbers pertaining to the stations on a party line should be related in this or any other way. Each cross-point circuit comprises a first coupling resistor, such as R1163V, and a first coupling gas-filled diode, such as D1163V, which are connected in series, in the order stated, between the relevant input conductor such as C1163, and the relevant thousands-hundreds conductor, such as 11XX, and further comprises a second coupling resistor, such as R1163H, and a second coupling gas-filled diode, such as D1163H, which are connected in series, also in the order stated, between this input conductor and the relevant tens-units conductor such as XX63. The first and second coupling resistors of a cross-point circuit may each have a resistance of 68,000 ohms. The first and second coupling gas-filled diodes of a cross-point circuit are, of course, normally in the non-conducting condition. Additionally, each of the cross-point circuits that pertain to stations on party lines is provided with an inhibiting circuit element comprising a pair of inhibiting gas-filled diodes one of which, such as N1209V, is connected between, on the one hand, the junction between the first coupling resistor and the first coupling gas-filled diode of the cross-point circuit and, on the other hand, a control wire, such as BW, common to the inhibiting circuit elements of all cross-point circuits that pertain to party line stations having the same "party identity" as the particular station concerned, and the other of which, such as N1209H, is connected between said control wire on the one hand and the junction between the second coupling resistor and the second coupling gas-filled diode of the cross-point circuit on the other hand. The inhibiting gas-filled diodes constituting such an inhibiting circuit element are, of course, normally in the non-conducting condition. A control wire as just referred to, such as the control wire BW, is normally connected to negative battery by way of a break contact of a control relay, such as contact *b*1 of a control relay B, and a current-limiting resistor such as RB. Each resistor such as RB may have a resistance of 200 ohms. There has to be a control wire as just referred to for each "party identity" catered for, that is, there have to be as many such wires as the maximum number of stations there may be on a party line. By way of example, three such wires, namely AW, BW, and CW, together with the corresponding control relays A, B, and C with their respective break contacts *a*1, *b*1, and *c*1, are shown in the circuit diagram. The arrangements for operating a control relay, such as A, B, or C when such operation is required are not illustrated. It is arranged that a group of private branch exchange lines pertaining to a private branch exchange, such as the group comprising the four lines L4455/1 to L4455/4, in effect takes up, exclusively to itself, a series of the four-digit decimal numbers, such as the numbers 4455, 4456, 4457, and 4458, that comprises one number for each line in the group and that includes the particular four-digit decimal number, such as 4455, which is the identification number for all the lines of the group so far as calling-number identification is concerned and that is a series of consecutive numbers all having the same thousands digit and hundreds digit. The cross-point circuits, such as M4455, M4456, M4457 and M4458, pertaining to a group of private branch exchange lines are provided in the positions corresponding to the relevant series, as just referred to, of the four-digit decimal numbers, and these cross-point circuits are connected to the relevant thousands-hundreds conductor, such as 44XX, the same for all of them, in the same way as if each cross-point circuit concerned pertained to an ordinary subscriber's line and are connected to the relevant tens-units conductor, such as XX55, again the same for all of them, by connections, such as the connections SC, comprising direct connections between them and made by a simple strapping operation.

The calling-number-identifying arrangement comprises ten thousands-digit decimal output conductors 1XXX to 9XXX, 0XXX, and ten hundreds-digit decimal output conductors X1XX to X9XX, X0XX, and ten tens-digit decimal output conductors XX1X to XX9X, XX0X, and ten units-digit decimal output conductors XXX1 to XXX9, XXX0. Each thousands-hundreds conductor, such as 11XX, is coupled over respective ones of two isolating rectifiers, such as MR1 and MR2, individual to it to a corresponding thousands-digit decimal output conductor and to a corresponding hundreds-digit decimal output conductor, and is also connected over a further rectifier, such as MR3, individual to it to a biasing-voltage supply conductor BVA, the connection over the further rectifier, which serves as a clamping rectifier, serving to prevent the thousands-hundreds conductor from becoming substantially more negative than the conductor BVA. A voltage dividing arrangement comprising two resistors RD1 and RD2 maintains the conductor BVA at a suitable negative voltage, which may be minus 5 volts. The resistances of the resistors RD1 and RD2 may be 320 ohms and 2,200 ohms respectively. Each tens-units conductor, such as XX63, is coupled over respective ones of two isolating rectifiers, such as MR457 and MR458, individual to it to a corresponding tens-digit decimal output conductor and to a corresponding units-digit decimal output conductor, and is also connected over a further rectifier, such as MR459, individual to it to a biasing-voltage supply conductor BVB, the connection over the further rectifier, which serves as a clamping rectifier, serving to prevent the tens-units conductor from becoming substantially more negative than the conductor BVB. A voltage-dividing arrangement, comprising two resistors RD3 and RD4 corresponding respectively to the resistors RD1 and RD2 of the voltage-dividing arrangement associated with the biasing-voltage supply conductor BVA, maintains the conductor BVB at a suitable negative voltage nominally the same as that at which the conductor BVA is maintained. Each decimal output conductor is connected to a transistor amplifier that serves for amplifying the current fed to the conductor, when requisite, by way of the relevant isolating rectifier. Of the forty amplifiers connected to the forty decimal output conductors, which amplifiers may conveniently be termed pre-amplifiers since they are followed by multi-stage output amplifiers to be referred to shortly, only four typical ones are shown in the circuit diagram (FIG. 8). These typical ones are the pre-amplifiers PA/1XXX, PA/X1XX, PA/XX6X, and PA/XXX3 connected to the decimal output conductors 1XXX, X1XX, XX6X, and XXX3 respectively. Each pre-amplifier comprises a transistor such as VT1, a base circuit load resistor such as RP1, a capacitor such as CP1, and two rectifiers such as MR601 and MR602. The base circuit load resistor, such as RP1, of a pre-amplifier may have a resistance of 3,300 ohms. Such resistors serve, in the manner already explained, to ensure that an adequate proportion of the current passing through a coupling gas-filled diode in respect of a call passes to each of the two decimal output conductors concerned despite wide differences in the characteristics of the respective transistors, such as VT1, connected to these two decimal output conductors. In the case of the pre-amplifiers connected to the thousands-digit and hundreds-digit decimal output conductors, the base circuit load resistors are connected to the biasing-voltage supply conductor BVA, while in the case of the remaining pre-amplifiers these resistors are connected to the biasing-voltage supply conductor BVB. The capacitor, such as CP1, of the pre-amplifier may have a capacity of 0.01 microfarad. The two rectifiers, such as MR601 and MR602, of a pre-amplifier serve to connect the amplifier to the relevant two amplifiers of a group of five multi-stage output amplifiers pertaining to the digit place concerned, the arrangement of the pre-amplifiers and multi-stage output amplifiers being effectively such that what is a one-out-of-ten output marking as regards the decimal output conductors and the pre-amplifiers is a two-out-of-five output condition as regards the multi-stage output amplifiers. Of the twenty multi-stage output amplifiers (four groups of five) connected to the forty pre-amplifiers, only two typical ones are shown in the circuit diagram (FIG. 8). These typical ones are the multi-stage output amplifier MSM/0 to which the pre-amplifier PA/1XXX is connected over rectifier MR601, and the multi-stage output amplifier MSD/4 to which the pre-amplifier PA/XX6X is connected over rectifier MR652. Each multi-stage output amplifier comprises three transistors such as VT41, VT42, and VT43, and an output code relay, such as CRA, which is operated when the amplifier responds to a marking condition of an associated pre-amplifier. Upon operation, the output code relay, such as CRA, of a multi-stage output amplifier closes, at a contact such as *cra*, a loop across a pair of outgoing signalling wires such as WSA, to transmit the relevant output marking to a utilisation circuit.

Taking by way of example the case where calling-number identification is required in respect of a call originating from the ordinary subscriber's station S1163, the carrying out of such identification involves the application of an electrical marking condition to the input conductor C1163, the marking condition being transmitted to this input conductor over a through private wire set up for the call concerned and being a positive unidirectional pulse of short duration (for example 3 to 5 milliseconds) and of a voltage (for example 150 volts) that is high compared with the voltage (50 volts) of the exchange battery. This positive pulse causes the coupling gas-filled diodes D1163V and D1163H of the cross-point circuit M1163 to conduct, in series with the respective coupling resistors R1163V and R1163H, for the effective duration of the pulse, and thereby produces current flow in the low-resistance direction through each of the four isolating rectifiers MR1, MR2, MR457, and MR458 pertaining to the particular thousands-hundreds conductor and tens-units conductor forming the cross-point concerned, causing an electrical marking condition to appear upon each of the relevant four decimal output conductors 1XXX, X1XX, XX6X, and XXX3. As will be clear from what has already been said, the effect of this is to bring about, through the medium of the relevant four pre-amplifiers PA/1XXX, PA/X1XX, PA/XX6X, and PA/XXX3 the response of the relevant eight multi-stage output amplifiers (including in this case the amplifiers MSM/0 and MSD/4) to cause the four digits of the four-digit decimal number "1163" (the number to be identified) to be signalled, on a two-out-of-five code basis, over the relevant eight pairs of outgoing signalling wires (including in this case the pair WSA and the pair WSP).

Taking by way of further example the case where calling-number identification is required in respect of a call originating from the party line station S1209, the carrying out of such identification involves the application of a positive unidirectional pulse of the kind described to the input conductors C1208, C1209, and C1200, all these input conductors being involved since they are cross-connected on the intermediate distribution frame (I.D.F.) to the same private wire terminal TT on this frame, with the consequence that the pulse on being transmitted over the through private wire concerned reaches all of them. The carrying out of such identification further involves the operation, for a period covering the period of duration of the positive unidirectional pulse, of the control relay corresponding to the "party identity" of the particular party line station concerned, the particular control relay concerned in the present case being relay B. The positive unidirectional pulse causes the inhibiting gas filled diodes N1200V and N1200H of the inhibiting circuit element of the cross-point circuit M1200 to conduct with the consequence that the pulse is rendered ineffective so far as bringing the coupling gas-filled diodes D1200V and D1200H of this cross-point circuit to the conducting condition is concerned. The circuit in which the diodes N1200V and N1200H are caused to conduct includes, of course, the contact *a1* in its unoperated condition and resistor RA. The positive unidirectional pulse further causes the inhibiting gas-filled diodes N1208V and N1208H of the inhibiting circuit element of the cross-point circuit M1208 to conduct with the consequence that the pulse is rendered ineffective so far as bringing the coupling gas-filled diodes D1208V and D1208H of this cross-point circuit to the conducting condition is concerned, the circuit in which the diodes N1208V and N1208H are caused to conduct being one including the contact *c1* in its unoperated condition and resistor RC. Since in the circumstances being considered the contact *b1* is open, the inhibiting circuit element of the cross-point circuit M1209 is disabled. Accordingly, the positive unidirectional pulse causes the coupling gas-filled diodes D1209H and D1209V of the last-mentioned cross-point circuit to conduct for the effective duration of the pulse, and thereby produces current flow in the low-resistance direction through each of the four isolating rectifiers MR4, MR5, MR595, and MR596 pertaining to the particular thousands-hundreds conductor and tens-units conductor forming the cross-point concerned, causing an electrical marking condition to appear upon each of the relevant four decimal output conductors. As will be clear, the effect of this is to bring about the response of the relevant eight multi-stage output amplifiers to cause the four digits of the four-digit decimal number "1209" (the number to be identified) to be signalled, on a two-out-of-five code basis, over the relevant eight pairs of outgoing signalling wires (including in this case the pair WSA).

Taking by way of final example the case where calling-number identification is required in respect of a call originating at a station on the private branch exchange to which the four lines L4455/1 to L4455/4 pertain, the particular one of these four lines that is concerned being the line L4455/4, the carrying out of such identification involves the application of a positive unidirectional pulse of the kind described to the input conductor C4458. This positive pulse causes the coupling gas-filled diodes D4458V and D4458H of the cross-point circuit M4458 to conduct for the effective duration of the pulse, and thereby produces current flow in the low-resistance direction through the two isolating rectifiers MR100 and MR101 pertaining to the particular thousands-hundreds conductor (the conductor 44XX) involved in the formation of the cross-point concerned, and through the isolating rectifiers MR433 and MR434 pertaining to the particular tens-units conductor (the conductor XX55) to which the coupling gas-filled diode D4458H is connected by the connections SC, causing an electrical marking condition to appear upon each of the relevant four decimal output conductors. As will be clear, the effect of this is to bring about the response of the relevant eight multi-stage output amplifiers to cause the four digits of the four-digit decimal number "4455" (the number to be identified) to be signalled, on a two-out-of-five code basis, over the relevant eight pairs of signalling wires.

A calling-number-identifying arrangement as just described may have associated with it at least one "class of service" arrangement serving to give a "class of service" indication when calling-number identification is initiated in respect of a call from a station or line of a class concerned. Each such arrangement comprises an input conductor for and corresponding to each line and/or station concerned, and, for and corresponding to each such input conductor, a coupling circuit comprising a coupling resistor and a coupling gas-filled diode which are connected in series between the input conductor and a common wire of the arrangement. This common wire is connected to a pre-amplifier which is broadly similar to the pre-amplifiers shown in FIG. 8 except that it has across its capacitor a rectifier poled to offer a relatively low resistance to current flow in the direction towards said common wire, and except that it includes no other rectifiers. This pre-amplifier is connected to a multi-stage output amplifier similar to the multi-stage output amplifiers shown in FIG. 8. Each input conductor of such an arrangement is connected, at the intermediate distribution frame (I.D.F.) or otherwise, so that it has applied to it any positive unidirectional pulse of the kind described that is applied to a through private wire for the purpose of calling-number identification in respect of a call originating at the station, or over the line, to which the input conductor pertains. The application of such a pulse to an input conductor of such an arrangement brings about, by causing the coupling gas-filled diode of the relevant coupling circuit to conduct, and through the medium of the pre-amplifier of the arrangement, the response of the multi-stage output amplifier of the arrangement to cause an appropriate "class of service" indication to be signalled over the pair of signalling wires outgoing from this output amplifier.

In the practical realisation of the calling-number-identification and related arrangements which have been described, the components and suitable terminals may be carried by cards on which as many of the requisite connections as possible are provided by so-called printed wiring. The cross-point circuits may be mainly provided in the form of cards each carrying the coupling resistors and coupling gas-filled diodes for ten cross-point circuits, the inhibiting circuit elements for the cross-point circuits that pertain to stations on party lines being provided in the form of smaller cards each carrying the two inhibiting gas-filled diodes for constituting one inhibiting circuit element and each such that it can be clipped on to the card carrying the corresponding first and second coupling resistors and first and second coupling gas-filled diodes and such that the inhibiting gas filled diodes carried by it can readily be connected in circuit with these corresponding coupling resistors and coupling gas-filled diodes.

What we claim is:

1. In a telephone exchange, an arrangement for automatically identifying calling numbers pertaining to lines connected to the exchange, said arrangement comprising in combination:

(*a*) input conductors each individual to a line connected to the exchange, (*b*) thousands-digit and hundreds-digit and tens-digit and units-digit decimal output conductors, (*c*) two groups of conductors comprising a group of thousands-hundreds conductors and a group of tens-units conductors and constituting one cross-point for and corresponding to each of a plurality of four-digit decimal numbers constituting the numbers the arrangement is capable of identifying, (*d*) for and individual to each of said cross-points, a cross-point circuit comprising a pair of coupling gas-filled diodes and at least two coupling resistors and serving to couple an input conductor, individual to a line to which the particular four-digit decimal number corresponding to the cross-point pertains, to the particular thousands-hundreds conductor and tens-units conductor forming the cross-point, the coupling of said input conductor to one of these two conductors forming the cross-point being by way of one diode of the pair of coupling gas-filled diodes in series with at least one coupling resistor and the coupling of said input conductor to the other of these two conductors forming the cross-point being by way of the other diode of the pair in series with at least one coupling resistor and these diodes serving to cause each of these two conductors forming the cross-point to be normally, so far as the particular cross-point circuit is concerned, isolated from said input conductor by a coupling gas-filled diode in the non-conducting condition and isolated from the other conductor of the two by two coupling gas-filled diodes in the non-conducting condition, and (*e*) for and individual to each thousands-hundreds conductor two isolating rectifiers over respective ones of which the conductor is coupled to a corresponding thousands-digit decimal output conductor and to a corresponding hundreds-digit decimal output conuctor, and for and individual to each tens-units conductor two isolating rectifiers over respective ones of which the conductor is coupled to a corresponding tens-digit decimal output conductor and to a corresponding units-digit decimal output conductor, all such isolating rectifiers of the arrangement being connected in such sense that an electrical marking condition applied, for effecting identification of the calling number in respect of a call, to the particular input conductor relevant to the call, by causing each coupling gas-filled diode of the appropriate cross-point circuit to conduct in series with at least one coupling resistor of this cross-point circuit, produces current flow in the low-resistance direction through each of the four said isolating rectifiers pertaining to the particular thousands-hundreds conductor and tens-units conductor forming the cross-point concerned, causing an electrical marking condition to appear upon each of the relevant four decimal output conductors.

2. A calling-number-identifying arrangement as claimed in claim 1 in which a party line has individual to it one input conductor for and corresponding to each station on the line and each of these input conductors is coupled by a cross-point circuit to the particular thousands-hundreds conductor and tens-units conductor forming the cross-point corresponding to the particular four-digit decimal number peculiar to the station to which the input conductor pertains, and comprising, for and individual to each of the cross-point circuits that pertain to stations on party lines, an inhibiting circuit element that normally inhibits the bringing of the coupling gas-filled diodes of the particular cross-point circuit to the conducting condition, and further comprising, for and individual to each of the party-line-station groups obtained by grouping party line stations in accordance with their party identities so that each group consists of stations having the same party identity, a common disabling means for disabling, when calling-number identification is carried out in respect of a call from a party line station of the particular party-line-station group, the inhibiting circuit elements of all cross-point circuits that pertain to stations of this group.

3. A calling-number-identifying arrangement as claimed in claim 2 comprising, for and individual to each said party-line-station group, a control wire and a control relay that serves to disconnect, at a contact thereof when calling-number identification is carried out in respect of a call from a party line station of the particular party-line-station group, this control wire from a source of negative battery potential to which it is normally connected, and in which each cross-point circuit comprises a first coupling resistor and a first coupling gas-filled diode connected in series, in the order stated, between the relevant input conductor and the relevant thousands-hundreds conductor and further comprises a second coupling resistor and a second coupling gas-filled diode connected in series, also in the order stated, between this input conductor and the relevant tens-units conductor, and in which the inhibiting circuit element with which a cross-point circuit pertaining to a station on a party line is provided comprises a pair of inhibiting gas-filled diodes one of which is connected between, on the one hand, the junction between the first coupling resistor and the first coupling gas-filled diode of the cross-point circuit and, on the other hand, the said control wire pertaining to the party-line-station group to which the particular station concerned belongs and the other of which is connected between this control wire on the one hand and the junction between the second coupling resistor and the second coupling gas-filled diode of the cross-point circuit on the other hand.

4. A calling-number-identifying arrangement as claimed in claim 1 in which a group of private branch exchange lines pertaining to a private branch exchange has an input conductor, and a cross-point circuit, for and individual to each line of the group, and in effect takes up, exclusively to itself, a series of the four-digit decimal numbers that comprises one number for each line in the group and that includes the particular four-digit decimal number which is the identification number for all the lines of the group so far as calling number identification is concerned and that is a series of consecutive numbers all having the same thousands digit and hundreds digit, and in which the cross-point circuits pertaining to the group occupy the positions corresponding to said series of the four-digit decimal numbers, these cross-point circuits being connected to the relevant thousands-hundreds conductor, the same for all of them, in the same way as if each cross-point circuit concerned pertained to an ordinary subscriber's line and being connected to the relevant tens-units conductor, namely the one corresponding to said identification number and again the same for all of them, by connections comprising direct connections between them.

5. A calling-number-identifying arrangement as claimed in claim 1 comprising, for and individual to each decimal output conductor, a transistor amplifier serving for amplifying the current fed to the decimal output conductor, when requisite, by way of the relevant said isolating rectifier, this amplifier comprising a transistor that has its emitter-base resistance included in the input impedance of the amplifier and that has included in the individual circuit of its base electrode a load resistor of a resistance sufficient to produce the effect that the effective differential emitter-base resistance of the transistor rises materially once the transistor has bottomed, it being thereby arranged that what happens when a coupling gas-filled diode becomes conducting in respect of a call is that, of the two transistors respectively connected to the relevant two decimal output conductors, the one having inherently the lower emitter-base resistance takes the major proportion of the available current until it has bottomed and then, owing to the rise in the effective differential emitter-base resistance of this particular transistor once it has bottomed, the other transistor of the two obtains sufficient current also to bottom.

No references cited.